United States Patent
Lin et al.

(10) Patent No.: US 6,684,966 B2
(45) Date of Patent: Feb. 3, 2004

(54) PCD FACE SEAL FOR EARTH-BORING BIT

(75) Inventors: Chih Lin, Spring, TX (US); Terry Koltermann, The Woodlands, TX (US); Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 83 days.

(21) Appl. No.: 09/982,899

(22) Filed: Oct. 18, 2001

(65) Prior Publication Data

US 2003/0075363 A1 Apr. 24, 2003

(51) Int. Cl.$^7$ ............................................. E21B 10/22
(52) U.S. Cl. ....................................... 175/372; 384/94
(58) Field of Search ................... 175/372, 371, 175/359, 227, 228, 367; 384/94; 277/336

(56) References Cited

U.S. PATENT DOCUMENTS

| | | | |
|---|---|---|---|
| 4,255,165 A | 3/1981 | Dennis et al. | 51/309 |
| 4,398,952 A | 8/1983 | Drake | 419/18 |
| 4,516,641 A | 5/1985 | Burr | 175/228 |
| 4,802,539 A * | 2/1989 | Hall et al. | 175/371 |
| 4,892,420 A * | 1/1990 | Kruger | 175/371 |
| 5,049,164 A | 9/1991 | Horton et al. | 51/295 |
| 5,108,813 A | 4/1992 | Noda et al. | |
| 5,176,720 A | 1/1993 | Martell et al. | 51/293 |
| 5,304,342 A | 4/1994 | Hall, Jr. et al. | 419/11 |
| 5,351,772 A | 10/1994 | Smith | 175/428 |
| 5,472,058 A * | 12/1995 | Hooper et al. | 175/371 |
| 6,026,917 A | 2/2000 | Zahradnik et al. | 175/371 |
| 6,186,251 B1 * | 2/2001 | Butcher | 175/393 |

FOREIGN PATENT DOCUMENTS

| | | |
|---|---|---|
| EP | 0614999 B1 | 9/1994 |
| EP | 0675303 B1 | 7/1998 |
| GB | 2278865 A | 12/1994 |
| GB | 2288617 A | 10/1995 |
| GB | 2332461 A | 6/1999 |

OTHER PUBLICATIONS

Patent Application entitled "Diamond Enhanced Bearing for Earth–Boring Bit", Docket No. 024–7815.
Article entitled "Syndite PCD Wear–Resistant Parts" by A. Lammer, 5 pgs (undated).
Article entitled "Friction & Wear Behaviour of Syndite PCD" by K. Steinmetz, et al., 6 pgs. (undated).

* cited by examiner

*Primary Examiner*—David Bagnell
*Assistant Examiner*—Matthew J Smith
(74) *Attorney, Agent, or Firm*—Bracewell & Patterson, L.L.P.

(57) ABSTRACT

An earth-boring bit has a mechanical face seal assembly with PCD faces. The bit has a bearing shaft with a cone rotatably mounted on the bearing shaft. The seal locates between the bearing shaft and the cone for sealing lubricant therein. The seal includes at least one rigid seal ring having a carbide body and an annular PCD face located on it. The mating face may also be of a PCD material.

18 Claims, 3 Drawing Sheets

PCD FACE SEAL FOR EARTH-BORING BIT

TECHNICAL FIELD

This invention relates in general to earth-boring bits of the roller cutter variety. More particularly, the invention relates to a seal assembly for sealing lubricant within the bit and excluding drilling environment without the bit, the seal assembly having a polycrystalline diamond (PCD) face.

BACKGROUND ART

One of the most successful seal means used in earth-boring bits of the type having rotatable cutters is the O-ring seal disclosed in commonly assigned U.S. Pat. No. 3,397,928, to Galle. The o-ring seal successfully confines lubricant to the bearing area while excluding detritus for long periods of time before failure.

A more recent seal development is the rigid or metal face seal. In the rigid face seal type, the seal interface is between one or two rigid, usually steel, seal rings. One or two elastomer o-rings serve to energize or urge the seal faces of the rigid ring or rings in contact with each other. The rigid face seal has proved to be as successful as the o-ring seal and provides improved durability in high rotational speed applications.

However, because the seal faces of rigid face seals are in constant contact and slide relative to each other, the dominant mode of failure of the seals is wear. Eventually because of the wear, the seal face geometry changes such that the ability of the seal to maintain sealing effectiveness is lost. This leads to eventual seal failure and ultimately results in bit failure. In an effort to minimize seal wear, rigid face seal rings of prior-art seals are constructed of metal alloys such as 440C stainless steel or cobalt base alloys such as Stellite. Use of these materials for the rigid face seals has resulted in significantly increased bit life, but additional improvement in the seal durability is desirable to extend the life in the most severe applications.

Super-hard materials such as natural and synthetic diamond materials have been used on cutting elements for drill bits for some time. It is also known to utilize polycrystalline diamond (PCD) on cutting elements on drill bits of both the fixed cutter and rolling cone type. Also, PCD is used for thrust bearings for downhole drilling motors. The individual PCD disks are spaced in a circular array around the face of a shaft. The PCD diamond material is usually formed in high temperature and high pressure conditions ("HTHP") in which the super-hard material is thermodynamically stable. This technique is conventional and known by those skilled in the art. In the most common process, diamond powder is placed in a refractory vessel. A sintered tungsten carbide disk is placed on the diamond powder. The contents of the vessel are then subjected to high pressure and temperature.

Silicon bonded PCD disks are also available, such as described in U.S. Pat. No. 4,793,828. A silicon bonded PCD disk has a mass of diamond particles present in an amount of 80 to 90 percent by volume and a second phase present in an amount of 10–20 percent by volume. The mass of diamond particles contains substantial diamond-to-diamond bonding to form a coherent, skeletal mass. The second phase consists essentially of silicon, the silicon being in the form of silicon and/or silicon carbide.

SUMMARY OF INVENTION

In this invention, the seal assembly is of a rigid face seal type. In one embodiment, at least one of the rigid seal rings has a polycrystalline diamond layer located thereon. The PCD layer is formed on a carbide substrate as a disk in the HTHP process. This results in a fairly thick diamond face having an average thickness in the range from about 0.5 to 5 mm sintered on a carbide backing. A circular central portion of the disk is then cut out, leaving a part in the shape of a washer. The washer may be subsequently shaped to form at least one of the face seals or bonded by a suitable means to a substrate to form at least one of the face seals.

In another embodiment, preferably the binder for the PCD element is silicon without a carbide backing. After the disk is formed, a laser is employed to cut out the central portion. The layer is then secured to a metal body of the ring by brazing or an adhesive such as epoxy. The metal of the ring is preferably a hardened metal, such as steel, but it may also be a carbide. Preferably the opposite or mating face has a PCD face formed in the same manner by an HTHP process. Additionally, one or both of the faces may contain surface features to enhance lubrication of the seal.

BEST MODE FOR CARRYING OUT THE INVENTION

Figure 1:
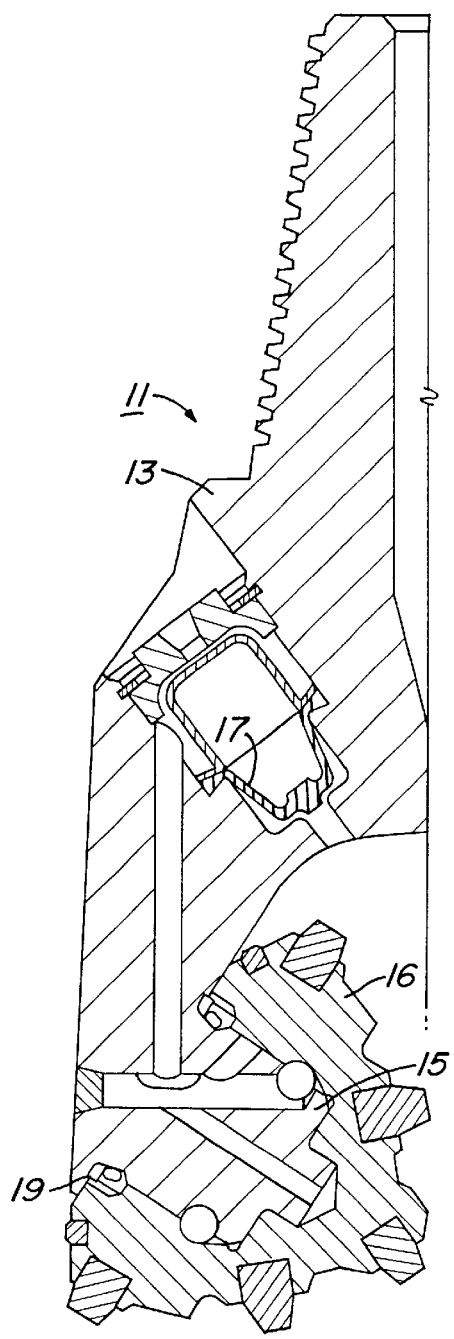
FIG. 1 is a longitudinal sectional view of one leg of an earth-boring bit having a seal assembly in accordance with this invention.

Referring to FIG. 1, bit 11 has a body 13. Body 13 has a leg with a depending bearing pin 15 extending downward and inward. Bit 11 of the embodiment shown will have as many as three bearing pins 15, but only one is shown. A cone 16 is rotatably mounted to each bearing pin 15. Cone 16 has a plurality of external teeth that may be integrally formed with the body of cone 16, or formed of tungsten carbide and pressed into holes, as shown.

Figure 2:
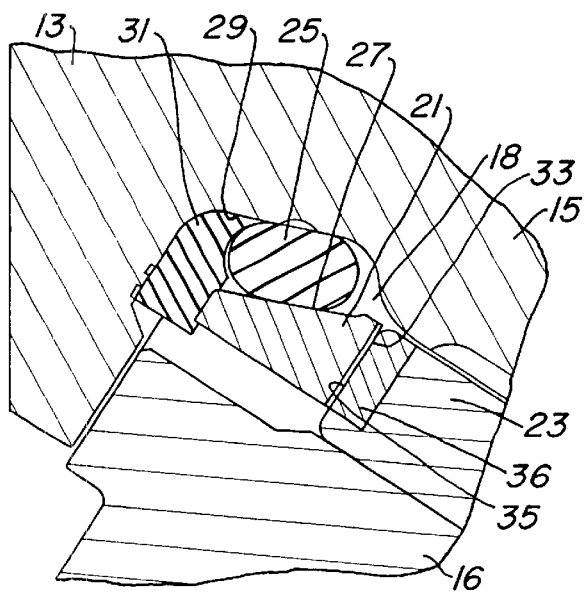
FIG. 2 is an enlarged sectional view of the seal assembly of FIG. 1.

The bearing spaces between bearing pin 15 and cone 16 are filled with a lubricant 18 (FIG. 2). A lubricant compensator 17 equalizes pressure on the exterior of bit 11 with the pressure of lubricant 18 contained in the bearing spaces. A seal assembly 19 located near the base of bearing pin 15 seals lubricant 18 within the bearing spaces.

Referring to FIG. 2, in the preferred embodiment, seal assembly 19 includes a rigid ring 21 surrounding bearing pin 15 near the base of bearing pin 15. Rigid ring 21 is urged into sliding contact with an annular insert 23, which is a ring or sleeve shrink-fit into the cavity of cone 16. Insert 23 rotates in unison with cone 16, while rigid ring 21 remains stationary with bearing pin 15. An energizing elastomer 25 is deformed between an inner diameter surface 27 of rigid ring 21 and seal cavity 29. Energizing elastomer 25 exerts a force on rigid ring 21 against insert 23. Energizing elastomer 25 also seals lubricant 18 located within the bearing spaces. In this embodiment, an excluder elastomer 31 is also utilized. Excluder elastomer 31 is deformed between a portion of seal cavity 29 in bearing pin 15 and both energizing elastomer 25 and an end of rigid seal ring 21. Excluder elastomer 31 serves to prevent the entry of debris into contact with energizing elastomer 25.

Figure 3:
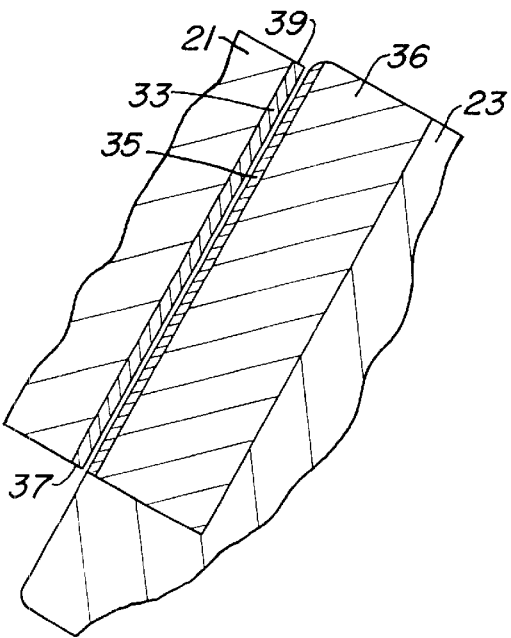
FIG. 3 is a further enlarged view of the mating faces of the seal assembly of FIG. 2, with diamond layers shown exaggerated in thickness.
Figure 4:
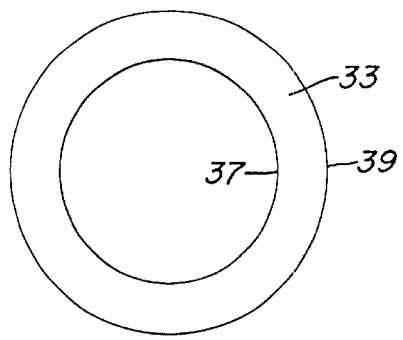
FIG. 4 is a plan view of one of the rigid seal rings of seal assembly of FIG. 2.

Referring to FIG. 3, preferably both rigid ring 21 and insert 23 have a PCD face 33, 35 formed thereon. In the preferred embodiment, the bodies of rigid ring 21 and insert 23 are of a hardened metal, such as steel, selected from the group consisting of iron, cobalt and alloys thereof. Referring to FIG. 4, rigid ring 21 is annular, having an inner diameter 37 that extends around bearing pin 15 (FIG. 1) and an outer diameter 39. Insert 23 also has an inner diameter and an outer diameter and is shrink fit in cone 16 (FIG. 2). In this embodiment, faces 33, 35 are smooth and flat and parallel to each other from the inner diameter 37 to the outer diameter 39. Face 35 is bonded to a metal carbide body 36 that is mounted in a recess in insert 23.

In the preferred embodiment PCD faces 33, 35 are formed as circular disks using a metal binder such as cobalt, nickel, or alloys thereof. In this technique, rigid ring 21 and body 36 of insert 23 are formed of carbide, such as tungsten carbide. A conventional HTHP process for forming PCD diamond material is used. A diamond powder is placed within a refractory container of the desired exterior cylindrical shape. A pre-sintered cemented carbide disk, such as tungsten carbide, is then placed on the diamond powder within the container. Next, the container is surrounded by pressure transmitting material, which is generally salt, boron nitride, graphite or a similar material. This assembly is then loaded into a high pressure and temperature cell. The cell is compressed until the desired pressure is reached and then heat is supplied, normal via a graphite-tube electric resistance heater. Temperatures in excess of 1350° C. and pressures in excess of 50 kilobars are common. At these conditions, the binder metal is molten and acts as a reactive liquid phase to enhance sintering of the diamond material. After a few minutes, the conditions are reduced to room temperature and pressure. The carbide disk with the diamond face is then broken out of the container. Two carbide disks are required, one for rigid ring 21 and the other for insert 23.

Using a conventional electrical discharge machining (EDM) process, a technician then cuts a circular portion out of the center of one of the disks, through the diamond face and tungsten carbide body, to create the annular configuration of seal ring 21. The technician repeats the process for insert 23. PCD face 35, backed with carbide body 36, is then brazed or otherwise secured to the remaining portion of insert 23, which is of a hardened metal such as steel. The body of seal ring 21 will preferably be entirely carbide in this embodiment.

In operation, cone 16 rotates about bearing pin 15 while bit body 11 is rotated. Rigid ring 21 will remain stationary with bearing pin 15. Lubricant contained in the bearing spaces is sealed by the dynamic interface between faces 33, 35. Elastomer energizer 25 and excluder elastomer 31 remain stationary with bit body 11.

In an alternate embodiment, rather than cobalt or nickel, silicon is used as a binder. PCD components using silicon as a binder are commercially available from DeBeers, Johannesburg, South Africa, under the trademark Syndax. The disks are formed to a thickness of about 0.5 to 2.0 millimeter, with the outer diameter preferably being the same as outer diameters of faces 33, 35. The silicon base PCD disk does not have a carbide backing, rather it is a free standing disk. A laser is employed to cut circular holes in the disks, forming the inner diameters of faces 33, 35. Then face 33 is bonded to rigid backing ring 21 and face 35 is bonded to insert 23. The bonding may be by brazing or adhesive. The method of attaching should be below the lowest transformation temperature of the material of rigid ring 21 and insert 23 so as to not degrade its mechanical properties. The lowest transformation temperatures of iron and cobalt-based alloys, such as 440C stainless steel, is about 730 degrees C. The silicon bonded PCD seal ring may be more difficult to manufacture than the cobalt bonded PCD described above, but the wear characteristics in a sliding tribological couple are better than cobalt bonded PCD.

Figure 5:
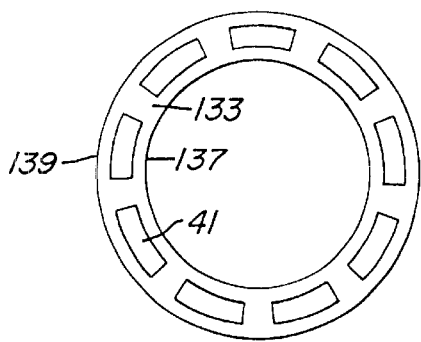
FIG. 5 is a plan view of an alternate embodiment of a rigid seal ring for use with the earth-boring bit of FIG. 1.

FIGS. 5–13 illustrate alternate embodiments of the configuration of diamond face 33. These alternate embodiments could be utilized for either or both of the faces 33, 35, regardless of whether PCD faces 33, 35 are formed with silicon as a binder or cobalt as a binder. In the embodiment of FIG. 5, generally rectangular shallow pockets 41 are formed circumferentially around face 133. Each recess 41 is spaced circumferentially from other recesses and also spaced inward from outer diameter 139 and outward from inner diameter 137. Recesses 41 serve to retain lubricant.

Figure 6:
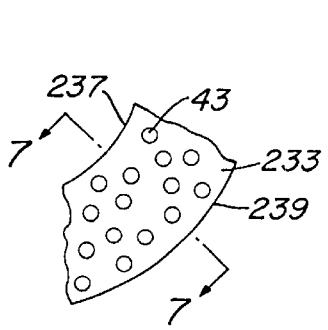
FIG. 6 is a partial plan view of another alternate embodiment of a rigid seal ring for use with the earth-boring bit of FIG. 1.
Figure 7:
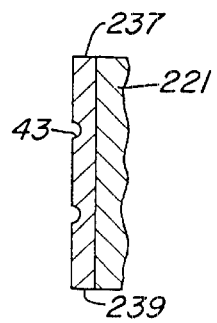
FIG. 7 is a partial plan view of the seal ring of FIG. 6, taken along the line 7—7 of FIG. 6.

In FIGS. 6 and 7, recesses 43 are small circular depressions formed in face 233 attached to rigid ring 221. A number of recesses 43 are spaced between inner diameter 237 and outer diameter 239 of face 233. Also, a number of recesses 43 are spaced around the circumference of face 233.

Figure 8:
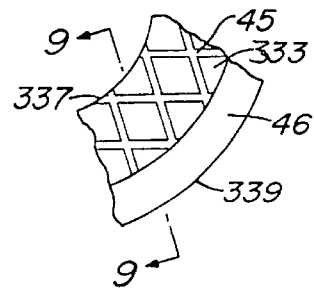
FIG. 8 is a partial plan view of another embodiment of a rigid seal ring for use with the earth-boring bit of FIG. 1.
Figure 9:
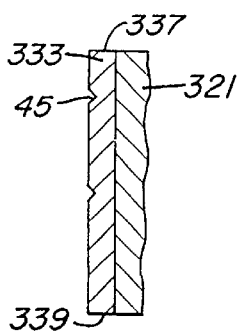
FIG. 9 is a sectional view of the seal ring of FIG. 8, taken along the line 9—9 of FIG. 8.

In the embodiment of FIGS. 8 and 9, a plurality of grooves 45 are formed in face 333 of rigid ring 321. Each groove 45 extends from the inner diameter 337 to a land 46 of specified width at the perimeter 339 of the seal face. Land 46 is a smooth flat surface that extends to the outer diameter 339. Each groove 45 intersects other grooves 45, forming a diamond cross-hatched pattern.

Figure 10:
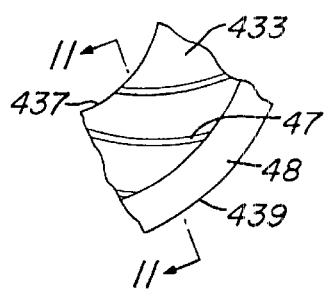
FIG. 10 is a partial plan view of another embodiment of a rigid seal ring for the earth-boring bit of FIG. 1.
Figure 11:
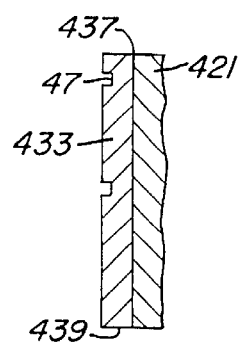
FIG. 11 is a sectional view of the seal ring of FIG. 10, taken along the line 11—11 of FIG. 10.

In the embodiment of FIGS. 10 and 11, face 433 of rigid ring 421 has plurality of parallel curved grooves 47. Each groove 47 extends from inner diameter 437 to a land 48 of selected width. Land 48 is a smooth flat surface that extends to the outer diameter 439. Grooves 47 do not intersect each other in the embodiment of FIGS. 10 and 11.

The lubricant pockets, such as shown in FIGS. 5–11, may then be formed by a variety of techniques. In one technique, a laser is used at low power to remove portions of the binder material from the diamond faces 33, 35. Alternately, a chemical treatment maybe employed. The depths of the pockets are only a few microns.

Figure 12:
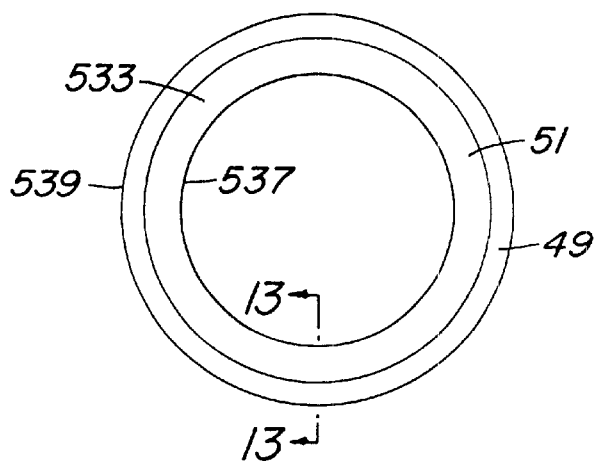
FIG. 12 is a plan view of another embodiment of a rigid seal ring for the earth boring bit of FIG. 1.
Figure 13:
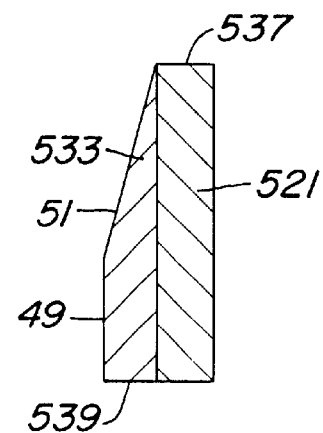
FIG. 13 is a sectional view of the seal ring of FIG. 12, taken along the line 12—12 of FIG. 12.

In the embodiment of FIGS. 12 and 13, seal ring 521 has an inner diameter 537 and an outer diameter 539. A land 49 that is flat, normal to an axis of seal face 533, and parallel to the surface against which it seals extends inward from the outer diameter 539 a specified distance. A conical or tapered lubrication surface 51 of greater width than land 49 extends inward from land 49 to inner diameter 537. Tapered surface 51 is located at an angle relative to land 49 and is not in rotating sealing engagement with a mating surface. The mating surface for seal face 533 will be flat from its inner diameter to its outer diameter, such as illustrated by seal face 35 of FIG. 2. The width of the mating surface may be approximately the same as the width of seal ring 521 from its inner diameter 537 to its outer diameter 539, thus only an outer portion of the mating surface will be in rotating engagement with land 49. Tapered surface 51 is located on the lubricant side of the seal ring 521 when installed to define a space between seal face 533 and the mating surface to feed lubricant to land 49. Land 49 will enlarge in width as it wears in service.

The invention has significant advantages, providing increased wear resistance, lower coefficients of sliding friction and a lower operating temperature over prior art hardened steel faces. These factors combine to provide a longer lasting seal assembly and, thus, a longer lasting bit.

While the invention has been described in only a few of its forms, it should be apparent to those skilled in the art that it is not so limited, but susceptible to various changes without departing from the scope of the invention. For example, although FIG. 2 shows a single rigid seal ring supported by elastomers and engaging a rigid seal ring fixed to the cone, both rigid seal rings could be supported by elastomers.

We claim:

1. An earth-boring bit with an improved mechanical face seal assembly, the earth-boring bit comprising:
   a bit body;
   at least one cantilevered bearing shaft extending inwardly and downwardly from the bit body;
   at least one cone mounted for rotation on the bearing shaft; and
   a seal assembly disposed between the bearing shaft and the cone, the seal assembly including at least one rigid seal ring having a body and an annular continuous PCD face located thereon.

2. An earth-boring bit with an improved mechanical face seal assembly, the earth-boring bit comprising:
   a bit body;
   at least one cantilevered bearing shaft extending inwardly and downwardly from the bit body;
   at least one cone mounted for rotation on the bearing shaft;
   a seal assembly disposed between the bearing shaft and the cone, the seal assembly including at least one rigid seal ring having a body and an annular PCD face located thereon; and
   wherein the face has an average thickness in the range from about 0.2 to 5 millimeters.

3. The bit according to claim 1, wherein the body of the seal ring is formed of a hardened metal selected from the group consisting of iron, cobalt and alloys thereof.

4. The bit according to claim 1, wherein the body of the seal ring is formed of a carbide material.

5. The bit according to claim 1, wherein the PCD face has a silicon binder.

6. An earth-boring bit with an improved mechanical face seal assembly, the earth-boring bit comprising:
   a bit body;
   at least one cantilevered bearing shaft extending inwardly and downwardly from the bit body;
   at least one cone mounted for rotation on the bearing shaft;
   a seal assembly disposed between the bearing shaft and the cone, the seal assembly including at least one rigid seal ring having a body and an annular PCD face located thereon; and
   wherein the face has at least one recess formed therein for enhancing lubrication.

7. An earth-boring bit with an improved mechanical face seal assembly, the earth-boring bit comprising:
   a bit body;
   at least one cantilevered bearing shaft extending inwardly and downwardly from the bit body;
   at least one cone mounted for rotation on the bearing shaft;
   a seal assembly disposed between the bearing shaft and the cone, the seal assembly including at least one rigid seal ring having a body and an annular PCD face located thereon; and
   wherein the face has a plurality of recesses circumferentially spaced apart from each other for enhancing lubrication.

8. An earth-boring bit with an improved mechanical face seal assembly, the earth-boring bit comprising:
   a bit body;
   at least one cantilevered bearing shaft extending inwardly and downwardly from the bit body;
   at least one cone mounted for rotation on the bearing shaft;
   a seal assembly disposed between the bearing shaft and the cone, the seal assembly including at least one rigid seal ring having a body and an annular PCD face located thereon; and
   wherein the face has an inner diameter, an outer diameter, and a plurality of recesses circumferentially spaced apart from each other around the ring and radially spaced apart from each other between the inner and outer diameters.

9. The bit according to claim 1, wherein the face has an inner diameter, an outer diameter, a plurality of grooves, and a land located adjacent the outer diameter, the grooves extending from the inner diameter and terminating at the land.

10. An earth-boring bit with an improved mechanical face seal assembly, the earth-boring bit comprising:
    a bit body;
    at least one cantilevered bearing shaft extending inwardly and downwardly from the bit body;
    at least one cone mounted for rotation on the bearing shaft;
    a seal assembly disposed between the bearing shaft and the cone, the seal assembly including at least one rigid seal ring having a body and an annular PCD face located thereon; and
    wherein the face has an inner diameter, an outer diameter, a plurality of intersecting grooves, and a land located adjacent the outer diameter, the grooves extending from the inner diameter and terminating at the land.

11. The bit according to claim 1, wherein the face has a flat engaging portion and a conical tapered portion extending from the engaging portion, wherein the conical tapered portion is of a greater width that the engaging portion.

12. An earth-boring bit with an improved mechanical face seal assembly, the earth-boring bit comprising:

a bit body;

at least one cantilevered bearing shaft extending inwardly and downwardly from the bit body;

at least one cone mounted for rotation on the bearing shaft;

lubricant located in bearing spaces between the bearing shaft and the cone; and a seal assembly disposed between the bearing shaft and the cone for sealing the lubricant within the bearing spaces, the seal assembly including first and second seal rings, each of the first and second rings having a body with at least a portion being of a carbide and having an annular continuous PCD face located thereon.

13. An earth-boring bit with an improved mechanical face seal assembly, the earth-boring bit comprising:

a bit body;

at least one cantilevered bearing shaft extending inwardly and downwardly from the bit body;

at least one cone mounted for rotation on the bearing shaft;

lubricant located in bearing spaces between the bearing shaft and the cone;

a seal assembly disposed between the bearing shaft and the cone for sealing the lubricant within the bearing spaces, the seal assembly including first and second seal rings, each of the first and second rings having a body with at least a portion being of a carbide and having an annular PCD face located thereon; and wherein at least one of the PCD faces has a recess formed therein for enhancing lubrication.

14. An earth-boring bit with an improved mechanical face seal assembly, the earth-boring bit comprising:

a bit body;

at least one cantilevered bearing shaft extending inwardly and downwardly from the bit body;

at least one cone mounted for rotation on the bearing shaft;

lubricant located in bearing spaces between the bearing shaft and the cone;

a seal assembly disposed between the bearing shaft and the cone for sealing the lubricant within the bearing spaces, the seal assembly including first and second seal rings, each of the first and second rings having a body with at least a portion being of a carbide and having an annular PCD face located thereon; and wherein at least one of the PCD faces has a plurality of recesses circumferentially spaced apart from each other for enhancing lubrication.

15. An earth-boring bit with an improved mechanical face seal assembly, the earth-boring bit comprising:

a bit body;

at least one cantilevered bearing shaft extending inwardly and downwardly from the bit body;

at least one cone mounted for rotation on the bearing shaft;

lubricant located in bearing spaces between the bearing shaft and the cone;

a seal assembly disposed between the bearing shaft and the cone for sealing the lubricant within the bearing spaces, the seal assembly including first and second seal rings, each of the first and second rings having a body with at least a portion being of a carbide and having an annular PCD face located thereon; and wherein each of the PCD faces has an inner diameter and an outer diameter, and at least one of the PCD faces has a plurality of recesses circumferentially spaced apart from each other and radially spaced apart from each other between the inner and outer diameters.

16. The bit according to claim 12, wherein each of the PCD faces has an inner diameter and an outer diameter, and at least one of the faces has a plurality of grooves extending from the inner diameter to a land located adjacent the outer diameter.

17. An earth-boring bit with an improved mechanical face seal assembly, the earth-boring bit comprising:

a bit body;

at least one cantilevered bearing shaft extending inwardly and downwardly from the bit body;

at least one cone mounted for rotation on the bearing shaft;

lubricant located in bearing spaces between the bearing shaft and the cone;

a seal assembly disposed between the bearing shaft and the cone for sealing the lubricant within the bearing spaces, the seal assembly including first and second seal rings, each of the first and second rings having a body with at least a portion being of a carbide and having an annular PCD face located thereon; and wherein each of the PCD faces has an inner diameter and an outer diameter, and at least one of the faces has a plurality of intersecting grooves extending from the inner diameter to a land located adjacent the outer diameter.

18. The bit according to claim 12, wherein one of the faces has a flat engaging portion and a conical tapered portion extending from the engaging portion, wherein the conical tapered portion is of a greater width that the engaging portion.

* * * * *